United States Patent Office 3,766,257
Patented Oct. 16, 1973

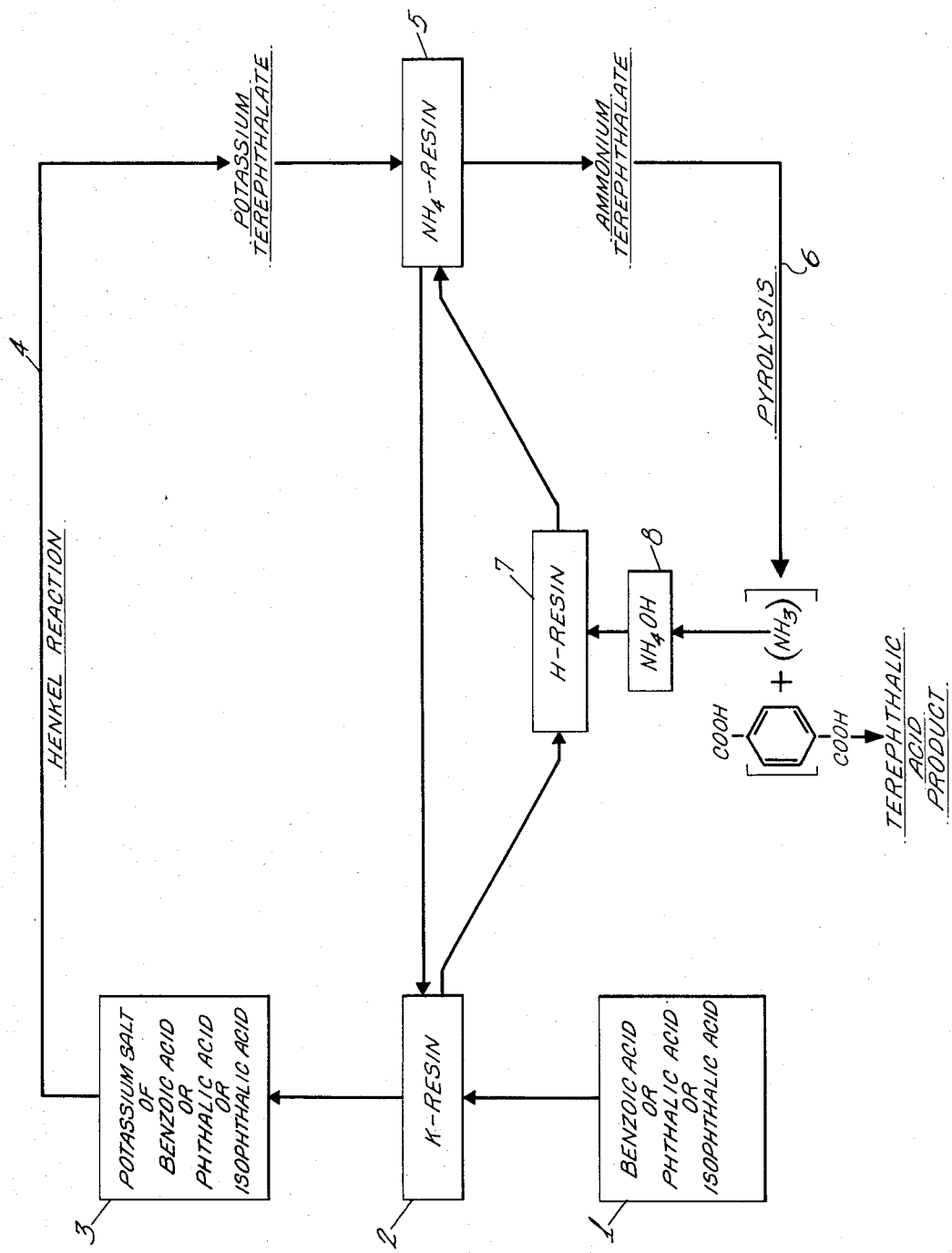

3,766,257
INTEGRATED TEREPHTHALIC ACID PROCESS
William W. Wimer, Anvil Hills, and Ronald D. Bushick, Glen Mills, Pa., assignors to Sun Research and Development Co., Philadelphia, Pa.
Filed May 28, 1971, Ser. No. 147,849
Int. Cl. C07c 63/26
U.S. Cl. 260—515 P
14 Claims

ABSTRACT OF THE DISCLOSURE

An integrated process for preparation of terephthalic acid from benzoic, phthalic, or isophthalic acids involving Henkel technology whereby ion exchange reactions are used as a means to obtain intermediates which enable recovery and reuse of potassium.

---

The Henkel reaction for the preparation of terephthalic acid is well known in the art (see for example U.S. 2,905,709, W. Schenk and G. Schiller, issued Sept. 22, 1959 and U.S. 2,794,830, B. Raecke et al., issued June 4, 1957). There are two versions of this process which may be illustrated as follows:

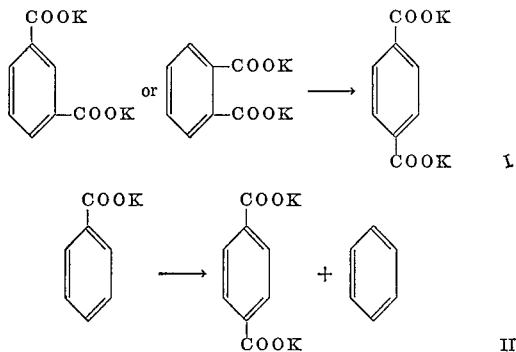

Reaction I involves simple isomerization while reaction II requires disproportionation, but both processes require use of potassium salts in order to achieve significant yields. The potassium salts of terephthalic acid formed in the reactions are converted to the terephthalic acid product by dissolving in water and acidifying with mineral acid, whereby the product precipitates out and is filtered off. A serious problem with this system is the difficulty in recovering the expensive potassium ion. Although some systems have been developed for such recovery, none is economically sound. Thus, for example, one technique is to precipitate the acid with sulfuric acid and uneconomically sell the potassium sulfate as fertilizer.

The process of this invention provides a means to obtain terephthalic acid through Henkel reactions with essentially complete recovery and reuse of potassium and thus is a significant contribution to the art in providing a much more economically attractive commercial process.

In accord with the invention there is provided an integrated process for the preparation of terephthalic acid from benzoic, phthalic, or isophthalic acids by Henkel type reaction which comprises the steps of:

(1) Converting benzoic acid, phthalic, or isophthalic acid to the potassium salt by ion exchange with an ion exchange resin in the potassium form whereby said resin is converted to the acid form, (2) Subjecting said potassium form of said acids from Step (1) to a Hankel type reaction to obtain potassium terephthalate, (3) Converting said potassium terephthalate to ammonium terephthalate by ion exchange with an ion exchange resin in the ammonium form, thereby exchanging said resin to the potassium form, (4) Pyrolyzing said ammonium terephthalate to terephthalic acid product and ammonia, (5) Recovering said ammonia and reacting it with the acid form of the ion exchange resin obtained in Step (1) in order to exchange said resin to the ammonium form, and (6) Repeating said cycle with fresh benzoic or phthalic acids to convert them to potassium salts by ion-exchange with the potassium form of the resin obtained in Step (3).

In order to further describe the invention reference is now made to the drawing:

Benzoic acid, phthalic acid, or isophthalic acid starting material 1 in aqueous, or aqueous alcoholic solution is subjected to ion exchange with the potassium form of an ion exchange resin 2 which converts the free acid to the potassium salt 3. As this occurs, the resin 2 becomes converted to the free acid form of the resin 7. The potassium salt 3 is then subjected to the conventional Henkel type reaction to obtain potassium terephthalate. If the Henkel reaction on potassium benzoate is used as shown above in I, benzene will also be obtained which may be recovered. The potassium terephthalate is dissolved in water and is exchanged with the ammonium form of the ion exchange resin 5 to yield ammonium terephthalate. During this exchange, the ammonium resin 5 is in turn exchanged to the potassium form 2. The ammonium terephthalate is then subjected to pyrolysis 6, as for example by the procedures outlined in U.S. 3,031,500 (Gasson et al., issued Apr. 24, 1962) to yield the terephthalic acid product and ammonia, which ammonia is recovered as ammonium hydroxide 8 and used to convert the H-resin 7 to the ammonium form 5. It is clear that as each of the various forms of the ion exchange resins become converted to their conjugate forms they are ready for further reaction in the system and it is also clear that the potassium in the system which is needed to form the potassium salts for the Henkel reaction, is, in effect, in constant recycle without loss.

The ion exchange resin used in the process may be any of the commercially available resins, but for economy one will choose a synthetic cation exchange resin having high exchange capacity. Such a resin sold as "Amberlite" IRC–50 (Rohm and Haas Co.) is particularly effective in the process of this invention, but other useful resins are also available such as "Duolite" CS–101 (Diamond Alakali Co.), "Ionac" C–270 (Ionac Chemical Co.), and "Permutit" H–70 (The Permutit Co.), all of which resins are carboxylic methacrylate polymers. Also useful, but less preferable are the sulfonated polystyrene-divinylbenzene copolymers such as "Ionac" AGA–242, "Permutit" Q(AG), and the like. It will be understood that the choice of solvent system for the material processed will depend upon its solubility and suitable solvent systems and desired concentrations are readily determined from solubility data and/or simple experimentation with the particular acid or acid salt in aqueous alcohol combinations.

The following experimental details will serve to further illustrate the process.

EXAMPLE 1

Conversion of acid to potassium salt 100 grams of dry "Amberlite IRC–50 in its acid form was stirred for 48 hours in an aqueous solution of potassium hydroxide. It was then filtered and extensively washed with distilled water. The resin was placed on a column and a solution of 3 g. per liter of benzoic acid was passed through and the first 720 ml. discarded. Six fractions were collected, the specific data being shown in Table I.

TABLE I.—CONVERSION OF BENZOIC ACID TO POTASSIUM BENZOATE BY ION EXCHANGE

| | Size (milliliters) | Flow rate, milliliters/min. | Acid No. |
|---|---|---|---|
| Fraction: | | | |
| 1 | 500 | 3.3 | <1 |
| 2 | 500 | 3.6 | <1 |
| 3 | 500 | 3.7 | <1 |
| 4 | 500 | 3.5 | <1 |
| 5 | 1,000 | 1.0 | <1 |
| 6 | 1,000 | 3.3 | <1 |

The various fractions were evaporated to dryness and the white solid subjected to infrared analysis which confirmed the material as potassium benzoate and further showed the absence of any benzoic acid.

EXAMPLE 2

Conversion of K-Salts to NH$_4$-Salts

Two hundred grams of wet resin (equal to 106 grams dry resin) were stirred for 48 hours in aqueous ammonium hydroxide (~14 N) and then placed in a glass column, 100 centimeters in length and 4.5 centimeters in diameter, and equipped with a stop-cock at the bottom and open at the top. The resin was then washed extensively with distilled water for about six hours. The water flow was reversed intermittently to ensure complete washing. The nitrogen content of the last wash was 25 parts per million. The height of the resin in the column was about 20 to 25 centimeters. One liter of aqueous dipotassium terephthalate solution (1.5 grams/liter) was run through the column, but was not saved. An aqueous solution containing 6.0 grams/liter of dipotassium terephthalate was prepared and added to the top of the column. This concentration was selected, based on the estimated solubility of the ammonium salts of terephthalic acid expected in the effluent. The aqueous solution was permitted to flow through the column at 3.3 milliliters per minute during the collection of the first 10 fractions of 100 milliliters each (see Table II). Nitrogen analyses of these solutions were done either by a modified Kjeldahl method or by a modified Dumas method. Potassium analyses were done using a flame photometer. Fractions 11, 12, 13, and 14 each contained 500 milliliters of solution and the flow rate during the collection was 1.67 milliliters per minute. Fractions 13 and 14 were combined after sampling (about 900 milliliters) and were recycled through the column (2.2 ml./min.) and were collected as fraction 15.

After sampling fraction 15, it was again recycled (about 900 milliliters) and was collected as fraction 16. In retrospect, recycling would not have been necessary, but analytical results were not immediately available and the recycling was done to insure complete exchange. A portion of fraction 9 was evaporated to dryness and a white solid was recovered. Nitrogen analysis (Dumas) showed 10.03 percent nitrogen; a repeat twenty-one days later gave a value of 9.04 percent. The diammonium salt of terephthalic acid is somewhat unstable and tends to lose ammonia. Samples of the solid, and authentic samples of dipotassium terephthalate, and diammonium terephthalate were submitted for X-ray examination using the Debyl-Scherrer film pattern technique. The white solid was essentially identical to the authentic sample of diammonium terephthalate. The pattern produced by the potassium terephthalate was not detected in the white solid, which confirmed the potassium analyses of samples from this series (see Table II). Infrared analyses also confirmed these findings.

TABLE II

| | Size (ml.) | Flow rate (ml./min.) | Nitrogen (p.p.m.) | | |
|---|---|---|---|---|---|
| | | | Kjeldahl | Dumas | Potassium |
| Fraction: | | | | | |
| 1 | 100 | 3.3 | 183 | | None detected. |
| 2 | 100 | 3.3 | 244 | | Do. |
| 3 | 100 | 3.3 | 407 | | Do. |
| 4 | 100 | 3.3 | | | |
| 5 | 100 | 3.3 | 762 | | Do. |
| 6 | 100 | 3.3 | 766 | | Do. |
| 7 | 100 | 3.3 | 753 | | Do. |
| 8 | 100 | 3.3 | | | |
| 9 | 100 | 3.3 | | 678 | Do. |
| 10 | 100 | 3.3 | 758 | | Not examined. |
| 11 | 500 | 1.7 | 633 | | Do. |
| 12 | 500 | 1.7 | 718 | | Do. |
| 13 | 500 | 1.7 | 648 | | Do. |
| 14 | 500 | 1.7 | 670 | | Do. |
| 15 | 900 | 2.2 | | | |
| 16 | 900 | 2.2 | 689 | 670 | Do. |

NOTE.—Dipotassium terephthalate, 6.0 grams/liter, if completely converted, should yield 4.96 grams of diammonium terephthalate. Nitrogen content of effluent would be 694 parts/million. Values in this table are not corrected for any residual nitrogen from the ammonium hydroxide preparation of the column or for any evaporation of the solution before analyses. The last wash contained 25 p.p.m. nitrogen.

It is clear from the above specific examples that the ion exchange technique embodied in the process of the invention permits complete conversion of the various terephthalic acid salts from one form to another without combination of starting material. Thus, the process yields high purity product and achieves essentially total recovery of potassium.

The invention claimed is:

1. An integrated process for the preparation of terephthalic acid from benzoic, phthalic or isophthalic acids by Henkel type reaction where a dipotassium salt of o-phthalic or isophthalic acid or where potassium benzoate is converted to potassium terephthalate, which comprises the steps of:
    (1) converting benzoic acid, phthalic or isophthalic acid to the potassium salt by ion exchange with a carboxylic methacrylate polymer type ion exchange resin in the potassium form whereby said resin is converted to the acid form,
    (2) subjecting said potassium form of said acid from Step (1) to isomerization or disproportionation in a Henkel type reaction to obtain potassium terephthalate,
    (3) converting said potassium terephthalate to ammonium terephthalate by ion exchange with said ion exchange resin in the ammonium form, thereby exchanging said resin to the potassium form,
    (4) pyrolyzing said ammonium terephthalate to terephthalic acid product and ammonia, (5) recovering said ammonia and reacting it with the acid form of the ion exchange resin obtained in Step (1) in order to exchange said resin to the ammonium form, and
(6) repeating said cycle with fresh benzoic or phthalic acid to convert it to a potassium salt by ion-exchange with the potassium form of the resin obtained in Step (3).

2. The process of claim 1 wherein the acid used is benzoic acid.

3. The process of claim 1 wherein the acid used is phthalic acid.

4. The process of claim 1 wherein the acid used is isophthalic acid.

References Cited

UNITED STATES PATENTS

| | | | |
|---|---|---|---|
| 2,823,229 | 2/1958 | Raecke | 260—515 |
| 2,905,709 | 9/1959 | Schenk et al. | 260—515 |
| 3,031,500 | 4/1962 | Gasson et al. | 260—515 |
| 3,439,026 | 4/1969 | Patton et al. | 260—515 |

OTHER REFERENCES

Calmon et al.: "Ion Exchangers in Org. and Biochemistry," Intersci. Pub., New York. (1957), pp. 57, 58, 138–9, 586.

JAMES A. PATTEN, Primary Examiner